(12) United States Patent
Lee et al.

(10) Patent No.: US 8,208,566 B2
(45) Date of Patent: Jun. 26, 2012

(54) APPARATUS AND METHOD FOR TRANSMITTING/RECEIVING FEEDBACK INFORMATION IN A MULTI-USER MIMO SYSTEM, AND SYSTEM THEREOF

(75) Inventors: Byong-Ok Lee, Buchon-si (KR); Kwang-Bok Lee, Seoul (KR); Chang-Soon Park, Chungju-si (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 1281 days.

(21) Appl. No.: 11/826,473

(22) Filed: Jul. 16, 2007

(65) Prior Publication Data

US 2008/0043874 A1    Feb. 21, 2008

Related U.S. Application Data

(60) Provisional application No. 60/838,869, filed on Aug. 21, 2006.

(30) Foreign Application Priority Data

Mar. 23, 2007    (KR) ........................ 10-2007-0028905

(51) Int. Cl.
   *H04K 1/10*    (2006.01)
(52) U.S. Cl. ........ 375/260; 375/262; 375/267; 375/295; 375/316; 375/346; 455/73; 455/101
(58) Field of Classification Search .................. 375/250, 375/254, 259, 260, 267, 272, 295, 299, 306, 375/316, 322, 342, 292, 343, 350, 135, 146, 375/150, 222, 262, 271, 344–346
See application file for complete search history.

(56) References Cited

U.S. PATENT DOCUMENTS 6,836,484 B2    12/2004    Suzuki
(Continued)

FOREIGN PATENT DOCUMENTS

EP    1 750 399    2/2005
(Continued)

OTHER PUBLICATIONS

Japanese Decision on Grant issued on Mar. 2, 2010, in corresponding Japanese Application No. 2007-214021 (3 pages).

*Primary Examiner* — Hirdepal Singh
(74) *Attorney, Agent, or Firm* — NSIP Law (57) ABSTRACT

A transmission/reception apparatus and method for reducing the amount of feedback information transmitted from a receiver in a multi-user MIMO system are provided. A transmitter determines a reference Channel Quality Information (CQI) and transmits the reference CQI to the receiver. Upon receipt of the reference CQI, the receiver compares the received reference CQI with a CQI of a stream received from the transmitter, sets a channel, over which the stream is received, to at least one of Activation and Inactivation, according to the comparison result, and transmits the set channel information to the transmitter. As a result, the receiver, even though it receives multiple streams from the transmitter, transmits to the transmitter the at least one of Activation and Inactivation information of the channel separately for each individual stream, thereby contributing to a reduction in the total amount of feedback information.

24 Claims, 7 Drawing Sheets

U.S. PATENT DOCUMENTS

| | | | |
|---|---|---|---|
| 7,738,538 B1 * | 6/2010 | Tung | 375/150 |
| 2004/0190486 A1 * | 9/2004 | Oshiba | 370/349 |
| 2005/0058057 A1 * | 3/2005 | Maltsev et al. | 370/203 |
| 2005/0201296 A1 * | 9/2005 | Vannithamby et al. | 370/241 |
| 2005/0208959 A1 * | 9/2005 | Chen et al. | 455/515 |
| 2006/0258303 A1 * | 11/2006 | Taira et al. | 455/101 |
| 2007/0147535 A1 * | 6/2007 | Niu et al. | 375/267 |
| 2007/0159393 A1 * | 7/2007 | Imai | 342/445 |
| 2008/0045153 A1 * | 2/2008 | Surineni et al. | 455/63.1 |

FOREIGN PATENT DOCUMENTS

| | | |
|---|---|---|
| JP | 2001-238269 | 8/2001 |
| JP | 2002-232334 A | 8/2002 |
| KR | 10-2004-0072817 | 8/2004 |
| KR | 10-2006-0031188 A | 4/2006 |
| WO | WO 2005/015801 A2 | 2/2005 |
| WO | WO 2006/020339 A2 | 2/2006 |
| WO | WO 2006/028204 A1 | 3/2006 |

* cited by examiner

APPARATUS AND METHOD FOR TRANSMITTING/RECEIVING FEEDBACK INFORMATION IN A MULTI-USER MIMO SYSTEM, AND SYSTEM THEREOF

CROSS-REFERENCE TO RELATED PATENT APPLICATION

This application claims the benefit under 35 U.S.C. §119(e) of a U.S. patent application filed in the United States Patent and Trademark Office on Aug. 21, 2006 and assigned Ser. No. 60/838,869, and under 35 U.S.C. §119(e) of a Korean Patent Application filed in the Korean Intellectual Property Office on Mar. 23, 2007 and assigned Serial No. 2007-28905, the disclosures of both of which are hereby incorporated by reference.

BACKGROUND OF THE INVENTION

1. Field of the Invention

The present invention relates generally to a multi-transmission/reception antenna system, known as a Multiple Input Multiple Output (MIMO) system. More particularly, the present invention relates to a transmission/reception apparatus and method for reducing the amount of feedback information transmitted from a plurality of receivers in a multi-user MIMO system, and a system thereof.

2. Description of the Related Art

Generally, the Beyond 3rd Generation (3G) system, that is, the 4th Generation (4G) system, refers to a system in which both a wireless network and core network provide characteristics of ubiquitous & seamless connection, high data rate, openness, and network convergence. The 4G system is designed to enable high-capacity data transmission, targeting the high data rate.

The 4G system should have a complex network configuration other than a single-network configuration. That is, the 4G system should have an integrated configuration of satellite network, wireless Local Area Network (LAN), Digital Audio Broadcast (DAB) network, Digital Video Broadcast (DVB) network, and the like. The integration of all types of networks enables multiple transceivers (for example, base stations and terminals) to simultaneously exchange data or signals using MIMO. This multi-user MIMO system arranges M antennas in a transmitter (or base station) and N antennas in receivers (or terminals). The transceivers can increase their data rate by exchanging signals using the antennas arranged in this manner.

To provide a multi-user MIMO service through the multiple antennas provided between transceivers, a transmitter needs Channel Quality Information (CQI) from multiple receivers. Therefore, the transmitter sends a request for feedback information including CQI, to the receivers. The transmitter requires more CQIs from the receivers in order to use multi-carrier technology and multi-antenna technology.

However, the increase in the amount of feedback information, or CQIs, increases not only throughput of the transceivers but also the required amount of resources, thereby causing a degradation of the entire system performance. In the conventional method proposed to address the drawbacks, the users having a CQI greater than a predetermined threshold are allowed to feed back their CQIs. Since the users having a better channel state perform CQI feedback, the method can reduce feedback overhead to some extent. However, because the users feed back CQIs without any processing, the method may still suffer from the feedback overhead.

Accordingly, there is a need for an improved transmission and reception apparatus and method for increasing system performance by reducing the amount of feedback information needed in a multi-user MIMO system.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a transmission/reception apparatus and method for increasing system performance by reducing the amount of feedback information in a multi-user MIMO system, and a system thereof.

Another aspect of exemplary embodiments of the present invention is to provide a CQI transmission/reception apparatus and method for feeding back CQI with one bit per channel in a multi-user MIMO system, and a system thereof.

Another aspect of exemplary embodiments of the present invention is to provide a transmitter for determining a reference CQI using CQIs received from multiple receivers for a case when the transmitter has knowledge of statistical distribution of the CQIs, and for another case when the transmitter has no knowledge of statistical distribution of the CQIs, and a feedback information reception apparatus and method of the transmitter.

Another aspect of exemplary embodiments of the present invention is to provide a receiver for comparing a reference CQI received from a transmitter with a CQI of a received stream and setting Activation (ON) and/or Inactivation (OFF) of a corresponding channel, according to the comparison result, and a feedback information transmission apparatus and method of the receiver.

According to one aspect of exemplary embodiments of the present invention, there is provided a transmitter for receiving feedback information in a Multiple Input Multiple Output (MIMO) system. The transmitter includes a channel state detector for receiving channel setting information from a receiver after transmitting a reference Channel Quality Information (CQI) to the receiver, and detecting a channel state of the receiver depending on information depending on the received channel setting information, and a controller for controlling beamforming of a plurality of antennas using the detected channel state.

According to another aspect of exemplary embodiments of the present invention, there is provided a feedback information reception method of a transmitter in a Multiple Input Multiple Output (MIMO) system. The feedback information reception method includes determining a reference Channel Quality Information (CQI) to be applied to a plurality of channels of a receiver; transmitting the determined reference CQI to the receiver; and receiving setting information of the channels from the receiver.

According to further another aspect of exemplary embodiments of the present invention, there is provided a receiver for transmitting feedback information in a Multiple Input Multiple Output (MIMO) system. The receiver includes a channel quality measurer for measuring a Channel Quality Information (CQI) of each stream received from a transmitter, a controller for comparing the measured CQI of the stream with a reference CQI received from the transmitter and setting a corresponding channel according to the comparison result, and a transmission unit for transmitting the comparison result to the transmitter.

According to yet another aspect of exemplary embodiments of the present invention, there is provided a feedback information transmission method of a receiver in a Multiple Input Multiple Output (MIME) system. The feedback information transmission method includes receiving a reference Channel Quality Information (CQI) from a transmitter, comparing the received reference CQI with a CQI of a stream received from the transmitter, generating channel state information according to the comparison result, and transmitting the channel state information to the transmitter.

BRIEF DESCRIPTION OF THE DRAWINGS

The above and other aspects, features and advantages of certain exemplary embodiments of the present invention will become more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well known functions and configurations are omitted for clarity and conciseness.

In the following description, exemplary embodiments of the present invention provide a multi-user MIMO system that increases system performance by reducing the amount of feedback information. Further, exemplary embodiments of the present invention provide a transmitter for determining a reference CQI for a case when the transmitter has knowledge of statistical distribution of CQIs and for another case when the transmitter has no knowledge of the statistical distribution of CQIs, and a method according thereto. In addition, exemplary embodiments of the present invention provide a receiver for comparing a reference CQI received from a transmitter with a CQI of a received stream, setting Activation (ON) and/or Inactivation (OFF) of a corresponding channel, and transmitting the set channel state information to the transmitter, and a method according thereto.

Figure 1:
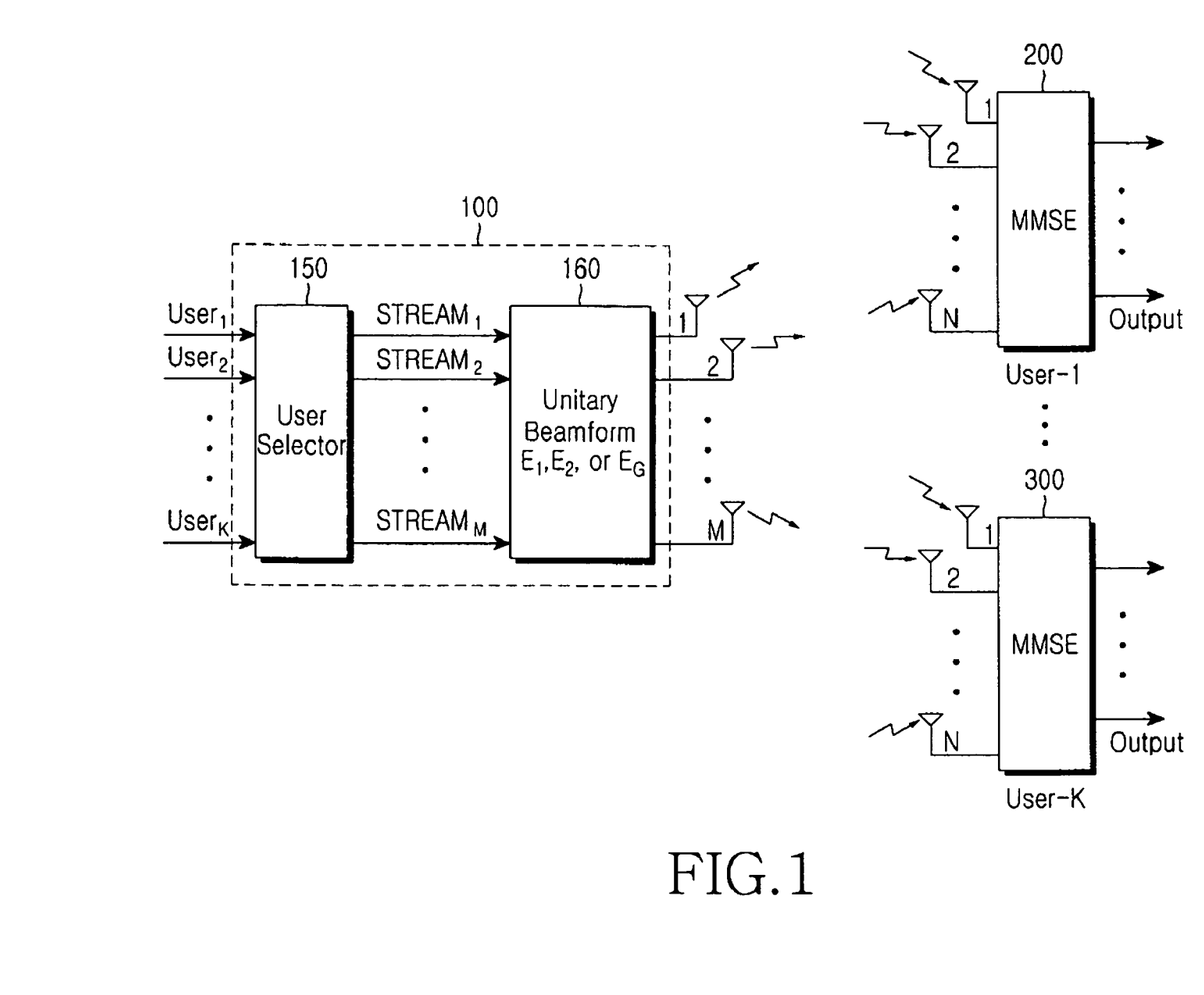
FIG. 1 is a diagram illustrating a configuration of a multi-user MIMO system according to an exemplary embodiment of the present invention.

FIG. 1 is a diagram illustrating a configuration of a multi-user MIMO system according to an exemplary embodiment of the present invention.

Referring to FIG. 1, the multi-user MIMO system, according to an exemplary embodiment of the present invention, includes a transmitter (or base station) 100 and a plurality of receivers (or terminals) 200 and 300.

The transmitter includes a user selector 150 and a unitary beamforming unit 160. The transmitter 100 performs a precoding process on a plurality of input user data User1, User2, . . . , Userk, and broadcasts the precoded user data via a plurality of transmission antennas. The receivers each receive the data broadcasted via a plurality of reception antennas, and store or reproduce the received data.

Accordingly, the transmitter provides a multi-user MIMO service between transceivers in the system, and broadcasts a reference CQI to the receivers in order to reduce the amount of feedback information. The reference CQI is a threshold used for setting channels of the receivers to an Activation or Inactivation state. Upon receipt of the reference CQI, the receivers each compare the received reference CQI with a CQI of a channel corresponding to a stream received later, set the corresponding channel to Activation/Inactivation (that is, ON/OFF) according to the comparison result, and transmit Activation/Inactivation signal or ON/OFF-signal to the transmitter. The Activation signal indicates the case where a CQI of a corresponding communication channel is greater than or equal to the reference CQI, and the Inactivation signal indicates the case where the CQI of the corresponding communication channel is less than the reference CQI.

Upon receipt of the Activation/Inactivation signals from the receivers, the transmitter generates a channel matrix based on the received Activation/Inactivation signals, and transmits a stream to the receivers using the generated channel matrix.

To perform this operation, the transmitter may appropriately set the reference CQI according to the system environment. A setting method can be divided into a method A in which the transmitter sets the reference CQI in the case when the transmitter has knowledge of statistical distribution, and a method B in which the transmitter sets the reference CQI in the case when the transmitter has no knowledge of the statistical distribution.

In addition, the transmitter can group the receivers according to CQI. That is, the transmitter can group the receivers that have a poor CQI as they are located in a cell boundary area or a shadow area, or can group the receivers having a good CQI.

Figure 2:
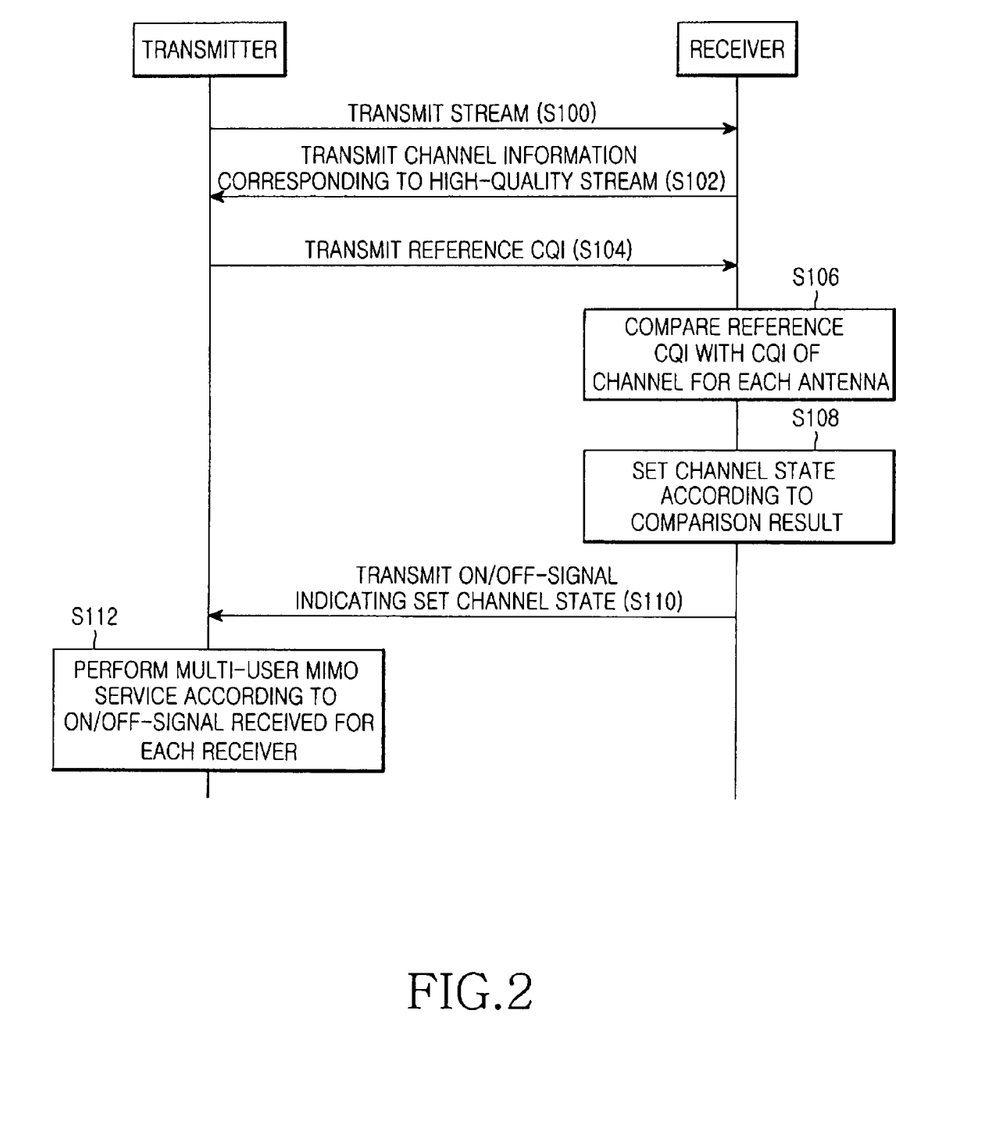
FIG. 2 is a flowchart illustrating a feedback method in a multi-user MIMO system according to an exemplary embodiment of the present invention.

FIG. 2 is a flowchart illustrating a feedback method in a multi-user MIMO system according to an exemplary embodiment of the present invention.

Referring to FIG. 2, a transmitter and a receiver both have a plurality of antennas, and provide/receive a multi-user MIMO service via the antennas. In the multi-antenna system including multi-antenna transceivers, the transmitter transmits a plurality of streams to the receiver in step S100. The streams can be transmitted to the receiver via one or more than one antenna.

Upon receipt of the streams from the transmitter, the receiver feeds back in step S102 to the transmitter the feedback information including quality of a channel corresponding to the stream having the highest channel gain among the received streams. The feedback information includes index information of the stream having the best quality among the streams and a CQI given at that time.

Thereafter, in step S104, the transmitter transmits a reference CQI to all receivers in the cell. The reference CQI can be measured or determined by the transmitter or the receiver for smooth signal exchange between transceivers, or can be flexibly set for high system performance. The reference CQI value can be commonly applied to all receivers, or can be separately applied to each receiver or each receiver group. A technique of determining the reference CQI value will be described below. Upon receiving the reference CQI in step S104, the receiver compares in step S106 the received reference CQI with a CQI of a communication channel using the stream received via each antenna included in the receiver. The CQI of the communication channel for each individual antenna can be measured depending on a pilot signal that the transmitter periodically transmits, or can be measured depending on the streams received from the transmitter. After measuring the CQI of the communication channel for each antenna in this manner, the receiver can periodically measure channel quality separately for each antenna included therein.

After comparing the received reference CQI with the CQI of the channel corresponding to the stream received separately for each antenna in step S106, the receiver sets a channel state according to the comparison result in step S108. Herein, the phrase 'setting the channel state' refers to setting Activation/Inactivation of a transmission/reception channel according to the comparison result. A process of setting the channel state to Activation means a process of connecting the transmitter to the channel of the corresponding antenna to perform communication, and a process of setting the channel state to Inactivation means a process of releasing (or disconnecting) the channel of the corresponding antenna from the transmitter to disable the communication, or setting the reference CQI to a CQI of the corresponding stream.

The Activation indicates that a CQI value of a corresponding stream can be used as a preset CQI value because the CQI value of the corresponding stream is greater than or equal to the preset CQI value. The Inactivation indicates that a CQI value of a corresponding stream cannot be used as a preset CQI value because the CQI value of the corresponding stream is less than the preset CQI value, or that the CQI value cannot participate in stream scheduling. For example, if a CQI value of a specific stream is a natural number greater than the reference CQI (that is, its real value is equal to the reference CQI, but is greater than the reference CQI by a decimal fraction value), the decimal fraction value-removed natural number (that is, an integer being identical to the reference CQI) is set as a CQI of the corresponding stream.

In this manner, if the CQI of the communication channel is greater than or equal to the reference CQI, the receiver sets the channel state to the Activation. However, if the CQI of the communication channel is less than the reference CQI, the receiver sets the channel state to the Inactivation.

After step S108, the receiver transmits to the transmitter an Activation/Inactivation signal indicating the set channel state in step S100. The number of the Activation/Inactivation signals can be one according to the receiver, or can be equal to the number of antennas according to the channel states of the antennas included in the receiver. The Activation/Inactivation signal has a 1-bit size.

Upon receipt of the Activation/Inactivation signals from multiple receivers, the transmitter transmits streams to more than one receiver using channels corresponding to the received Activation/Inactivation signals and performs multi-user MIMO service according to the Activation/Inactivation signal received for each receiver in step S112.

Figure 3:
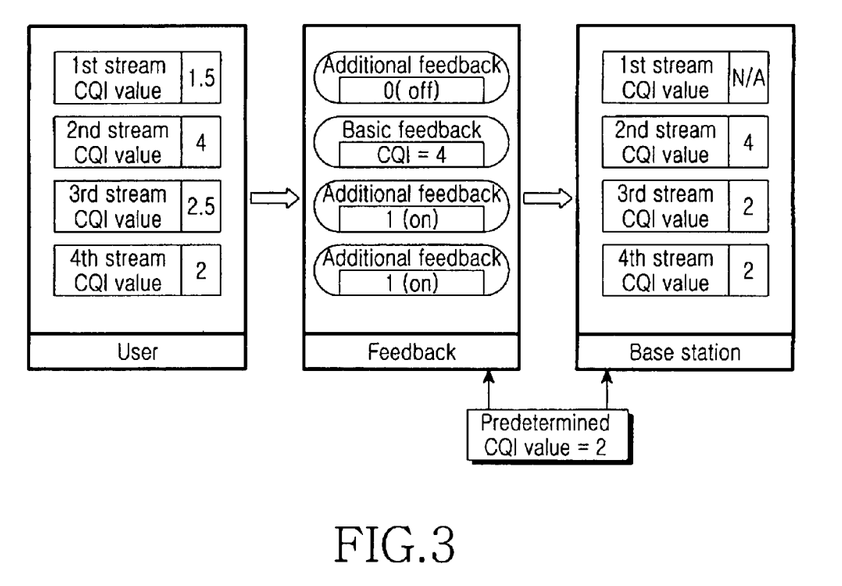
FIG. 3 is a block diagram illustrating an exemplary Activation/Inactivation switching feedback technique in a multi-user MIMO system according to an exemplary embodiment of the present invention.

FIG. 3 is a block diagram illustrating an exemplary Activation/Inactivation switching feedback technique in a multi-user MIMO system according to an embodiment of the present invention.

Referring to FIG. 3, a receiver receives multiple streams from a transmitter, and detects a stream having the greatest CQI among the received streams. As shown in the drawing, assume that a CQI of a first stream is 1.5, a CQI of a second stream is 4, a CQI of a third stream is 2.5, and a CQI of a fourth stream is 2. The receiver transmits the highest CQI=4 among the received CQI values to the base station. Thereafter, upon receipt of a reference CQI detected by multiple techniques from the transmitter, the receiver compares the received reference CQI with CQIs of the multiple streams, and then transmits an Activation/Inactivation signal based on the comparison result to the transmitter. That is, as shown in the drawing, the receiver transmits an Inactivation signal to the transmitter, for the first stream with CQI=1.5; transmits an Activation signal to the transmitter, for the third stream with CQI=2.5; and transmits an Activation signal to the transmitter, for the fourth stream with CQI=2. A description of the Activation/Inactivation switching feedback technique for reducing the amount of feedback information in the multi-user MIMO system has been described below, and a transceiver applied to the system will be described below.

Figure 4:
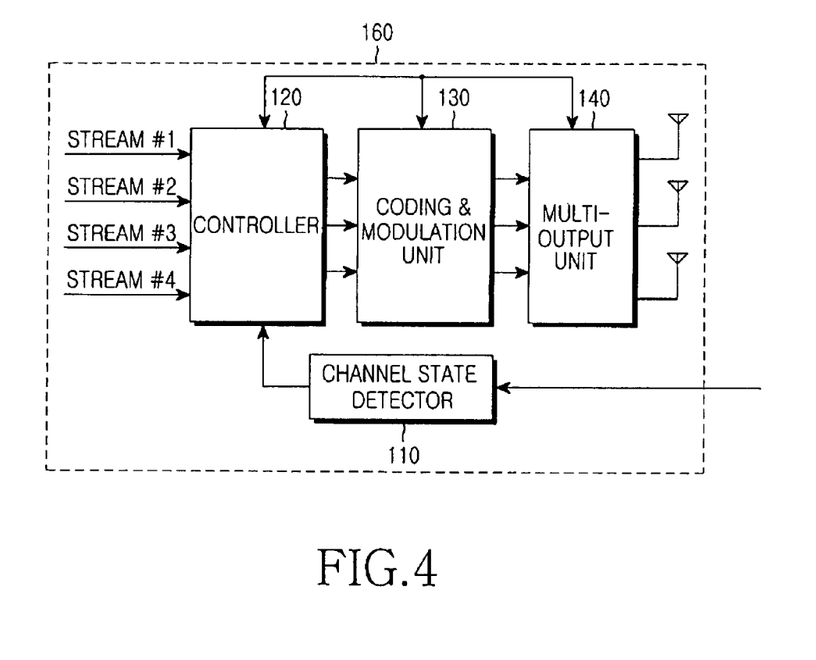
FIG. 4 is a block diagram illustrating a feedback information reception apparatus of a transmitter in a multi-user MIMO system according to an exemplary embodiment of the present invention.

FIG. 4 is a block diagram illustrating a feedback information reception apparatus of a transmitter in a multi-user MIMO system according to an exemplary embodiment of the present invention.

Referring to FIG. 4, the transmitter includes a channel state detector 110 for detecting a channel state for each individual receiver depending on CQIs received from multiple receivers, a controller 120 for controlling precoding and multi-output of streams to be transmitted via multiple antennas according to the detected channel state, a coding and modulation unit 130 for coding and modulating the multiple stream, and a multi-output unit 140 for multi-outputting the coded/modulated multiple streams via multiple antennas.

In addition, the transmitter includes a memory (not shown) for storing reference CQIs to be applied to multiple receivers, and storing channel state information received from the multiple receivers. Further, the controller 120 includes therein a module for determining a reference CQI using the method A or the method B described below, and transmitting the reference CQI to the receivers.

The transmitter first sets a reference CQI value using any one of the following two methods A and B.

A method of determining a reference CQI by the transmitter can be divided into two methods A and B for a case where the transmitter has knowledge of statistical distribution of CQIs and for another case where the transmitter has no knowledge of statistical distribution of CQIs.

A. Statistical Distribution of CQIs is Known

The transmitter, when it has knowledge of statistical distribution of CQIs, can determine a reference CQI using Equation (1).

$$\text{Prob}(\text{CQI} \geq \text{CQI}_{reference}) = \alpha \quad (1)$$

In Equation (1), $\text{CQI}_{reference}$ denotes a reference CQI, and $\alpha$ denotes a CQI acceptance rate indicating a probability that the transmitter will determine a given CQI as Activation, and is previously set by the transmitter. That is, the transmitter can set a given CQI to Activation by adjusting the probability $\alpha$. For example, in Equation (1), $\alpha=0.7$ means that a ratio of CQIs greater than the reference CQI ($\text{CQI}_{reference}$) to all CQIs is set to 70%. The transmitter can determine the reference CQI by adjusting the probability α in this manner.

The probability α can depend on the number of users, or the number of antennas included in each of receivers. That is, for a small number of users, the transmitter can set a high probability α to set a low reference CQI value, and for a large number of users, the transmitter can set a low probability α to set a high reference CQI value, thereby increasing system performance. The probability α is adjustable in this manner. The transmitter can perform communication with multiple users or multiple antennas by setting a low reference CQI.

B. Statistical Distribution of CQIs is Unknown

The transmitter, when it has no knowledge of statistical distribution of CQIs, can adjust a reference CQI using a ratio of Activations received from multiple users or multiple antennas. For example, if the ratio of Activations received from the users is high, the transmitter increases the reference CQI value. In contrast, if the Activation ratio is low, the transmitter decreases the reference CQI value, thereby increasing the system performance.

Equation (2) can be used by the transmitter to adjust a reference CQI value according to time when the transmitter has no knowledge of statistical distribution of CQIs.

$$CQI_{reference}^{(t+1)} = CQI_{reference}^{(t)} + w(\alpha_{target} - \alpha^{(t)}) \quad (2)$$

With use of Equation (2), the transmitter can calculate a reference CQI to be used at a specific time t+1. In Equation (2), $CQI_{reference}^{(t+1)}$ denotes a reference CQI to be used at a time t+1, $\alpha_{target}$ denotes an Activation ratio targeted by the system, and $\alpha^{(t)}$ denotes a ratio of Activations that more than one receiver has actually reported at a time t. In addition, w denotes a constant used for determining a possible change in the reference CQI according to time.

In this manner, with use of Equation (2), the transmitter can achieve the Activation ratio targeted by the system at a specific time, even though the transmitter has no knowledge of statistical distribution of CQIs.

After determining the reference CQI in this manner, the controller 120 transmits the reference CQI to the receiver.

Thereafter, the transmitter transmits streams to the receiver, and the receiver transmits CQIs of the streams to the transmitter depending on the received streams. The channel state detector 110, included in the transmitter, receives the CQIs of the individual streams from the receiver. The CQIs are received from multiple receivers, and include information on the channels that the receivers have set depending on the received streams. That is, the CQI includes ON-information indicating that the channel is set to Activation, and includes OFF-information indicating that the channel is set to Inactivation.

Upon receipt of the information indicating Activation or Inactivation of the channel state, the transmitter detects channel states of multiple antennas included in the receiver, and provides the detection result to the controller 120. The controller 120 controls transmission of multiple streams. That is, to transmit multiple input streams to the multiple receivers, the controller 120 precodes the multiple input streams, and generates a channel matrix depending on Activation and/or Inactivation signals received from the receivers. In addition, the controller 120 forms a beam of antennas included in the transmitter to transmit the precoded streams to the receivers via the multi-output unit 140. Thereafter, the controller 120 transmits streams to the receivers through the beamforming antennas.

Figure 5:
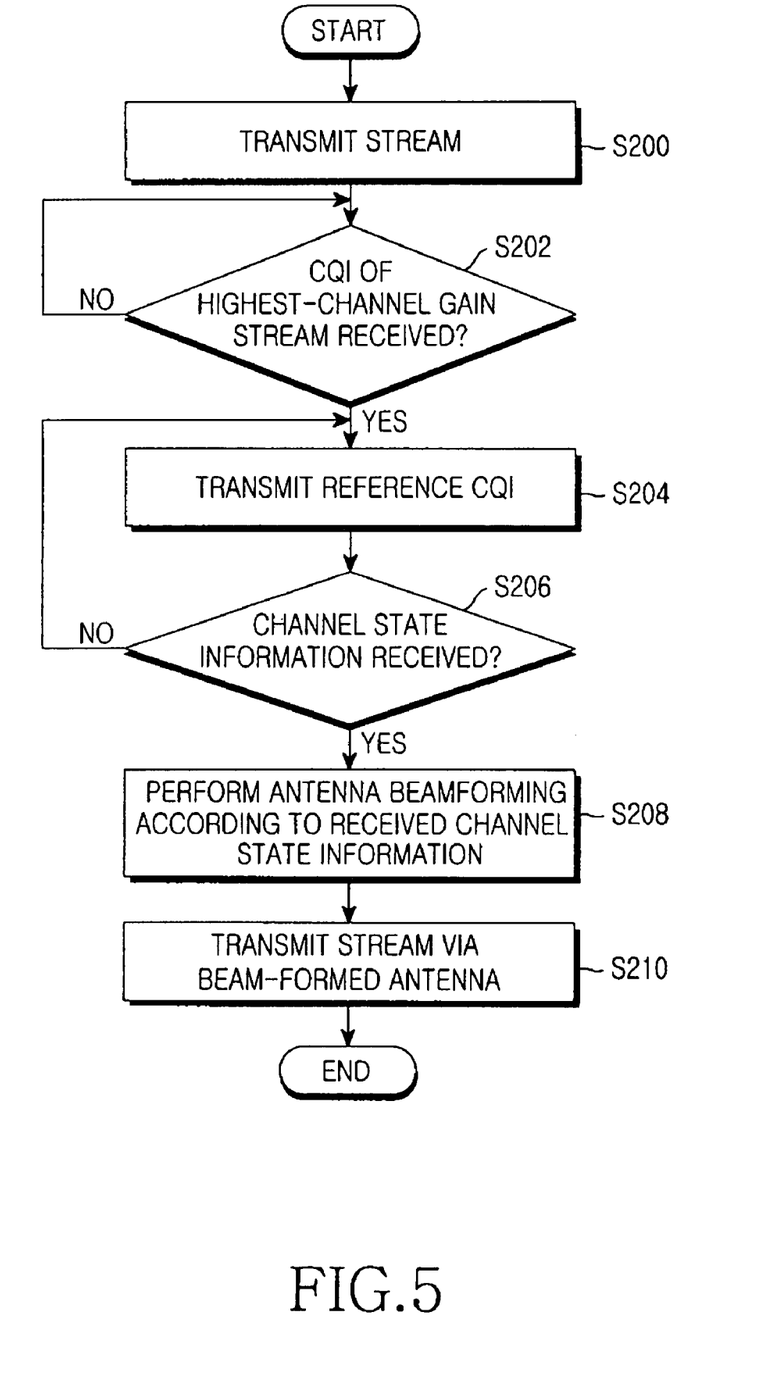
FIG. 5 is a flowchart illustrating a feedback information transmission/reception method of a transmitter in a multi-user MIMO system according to an exemplary embodiment of the present invention.

FIG. 5 is a flowchart illustrating a feedback information transmission/reception method of a transmitter in a multi-user MIMO system according to an exemplary embodiment of the present invention.

Referring to FIG. 5, the transmitter assumes that a threshold, a reference CQI to be applied to a receiver, has already been set. The reference CQI, as described above, can be set using at least one of the foregoing methods A and B, or can be set by a user of the receiver.

As shown in the drawing, the transmitter transmits streams to the receiver in step S200. The transmission streams can be transmitted via one antenna of the transmitter one by one, or can be simultaneously transmitted via multiple antennas of the transmitter. In this manner, the transmission streams from the transmitter are transmitted to more than one receiver. Upon receipt of the streams, the receiver measures channel quality separately for each individual antenna or channel depending on the received streams. Thereafter, the receiver detects the highest quality value among the measured qualities, that is, detects a CQI value of the stream having the highest channel gain among the received streams, and transmits the detected quality value to the transmitter. Upon receipt of the CQI of the stream with the highest channel gain from the receiver, the transmitter transmits the reference CQI to the receiver in steps S202 and S204.

The reference CQI can be previously set in the transmitter separately for each receiver, or can be determined using at least one of the methods A and B. In addition, the reference CQI is adjustable according to channel transmission conditions, system conditions, and priorities of receivers.

The reference CQI is applied to the remaining streams except for the highest-channel gain stream corresponding to the CQI value received in step S202. That is, upon receipt of the reference CQI, the receiver compares the CQIs of the remaining streams with the received reference CQI, and then transmits the comparison result to the transmitter. The remaining streams can be received at the receiver via one antenna, or can be received via multiple antennas separately for the individual streams.

For example, as a result of the comparison between the reference CQI value and a CQI for each of the remaining streams, if the reference CQI value is less than the CQI of each stream, the receiver transmits an Activation signal to the transmitter. However, if the reference CQI value is greater than or equal to the CQI of each stream, the receiver transmits an Inactivation signal to the transmitter.

Upon receipt of the Activation/Inactivation signal, that is, channel state information, from the receiver in step S206, the transmitter performs antenna beamforming according to the received channel state information in step S208. The process of performing antenna beamforming includes indicating that the transmitter can use antennas having higher channel quality or higher data rate, among the multiple antennas included therein.

After performing antenna beamforming in step S208, the transmitter transmits streams to the receiver via the beamforming antennas in step S210.

Figure 6:
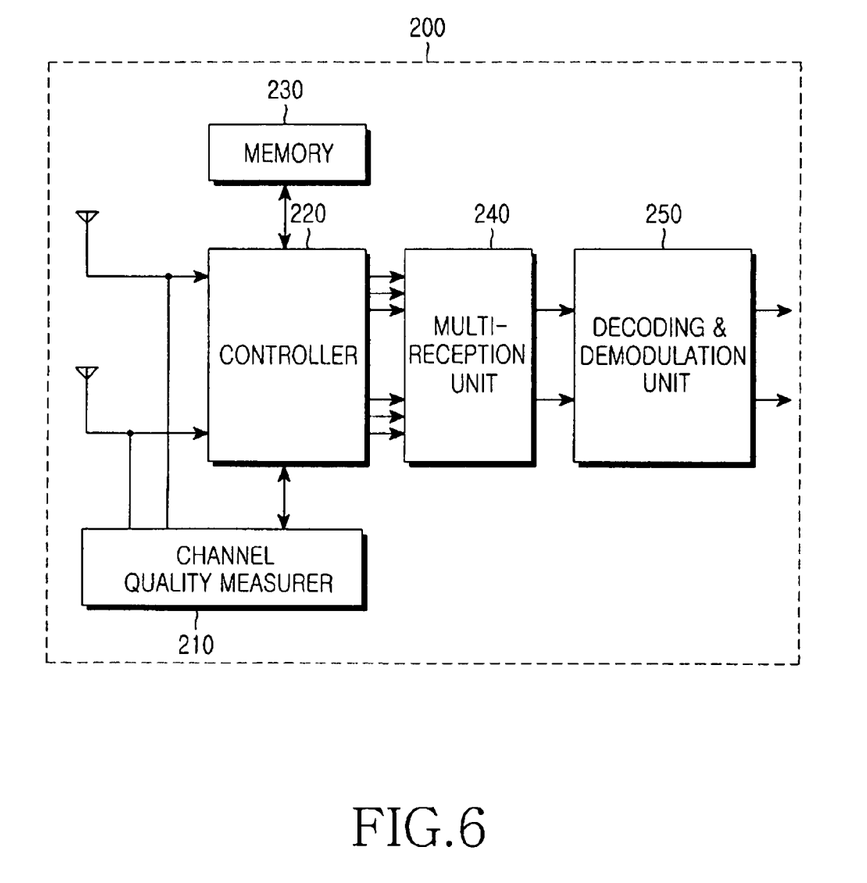
FIG. 6 is a block diagram illustrating a feedback information transmission/reception apparatus of a receiver in a multi-user MIMO system according to an exemplary embodiment of the present invention.

FIG. 6 is a block diagram illustrating a feedback information transmission/reception apparatus of a receiver in a multi-user MIMO system according to an exemplary embodiment of the present invention.

Referring to FIG. 6, the receiver 200 includes a channel quality measurer 210 for measuring quality of each individual channel depending on streams received from a transmitter, a controller 220 for comparing the measured quality value, that is, measured CQI, of each channel with a reference CQI, a memory 230 for storing the reference CQI and the comparison result value from the controller 220, a multi-reception unit 240 for multi-receiving the streams received from the transmitter, and a decoding and demodulation unit 250 for decoding and demodulating the received streams. In addition, the receiver includes a transmission unit (not shown) for transmitting the comparison result to the transmitter.

Although a description of the following operation will be made herein based on one receiver, it will be understood by those skilled in the art that the operation can also be applied to all receivers that have received the reference CQI from the transmitter, or all receivers located in the coverage area of the transmitter. In addition, according to exemplary embodiments of the present invention, the receiver generates feedback information, and transmits the generated feedback information to the transmitter.

Referring to FIG. 6, it is assumed that the transmitter provides a MIMO service to the receiver. For the MIMO service, the transmitter and the receiver both can include a plurality of antennas. That is, the receiver receives a stream via each of the antennas.

The channel quality measurer 210 measures qualities (that is, CQIs) of downlink channels depending on the streams received separately via the individual antennas. Alternatively, the channel quality measurer 210 can measure a CQI depending on the stream having the best channel quality among all the received streams. The channel quality measurer 210 transmits the CQIs measured separately for the individual streams to the controller 220. Upon receipt of the measured CQIs, the controller 220 compares each of the measured CQIs with a reference CQI value. The reference CQI, received from the transmitter, is a threshold used for determining whether to set Activation or Inactivation for the antennas included in the receiver.

After comparing the CQI of each stream with the reference CQI value in this manner, if the reference CQI is greater than or equal to the CQI of the stream, the controller 220 sets the channel, over which the stream was received, to Inactivation (that is, OFF mode). The controller 220 stores the resulting Inactivation signal in the memory 230. However, if the reference CQI is less than the CQI of the stream, the controller 220 sets the channel, over which the stream was received, to Activation (that is, ON mode). Similarly, the controller 220 stores the resulting Activation signal in the memory 230.

The controller 220 can store the Activation or Inactivation signal in the memory separately for each individual stream on a one-by-one basis, or can store the Activation or Inactivation signals for all streams in the memory at a time after completion of the comparison for all streams.

After completion of the comparison for each stream or all streams, the controller 220 transmits the Activation and/or Inactivation signal(s) stored in the memory 230 to the transmitter.

A method of transmitting the Activation/Inactivation signals in the receiver according to an exemplary embodiment of the present invention can be divided into a method C of transmitting an Activation/Inactivation signal generated separately for each individual stream on a one-by-one basis, and a method D of transmitting Activation/Inactivation signals for all streams at a time.

C. Activation/Inactivation Signal Generated Separately for Each Stream is Transmitted One by One With reference to FIG. 7A, a detailed description will now be made of a feedback information transmission/reception method of a receiver in a multi-user MIMO system according to an exemplary embodiment of the present invention.

Figure 7A:
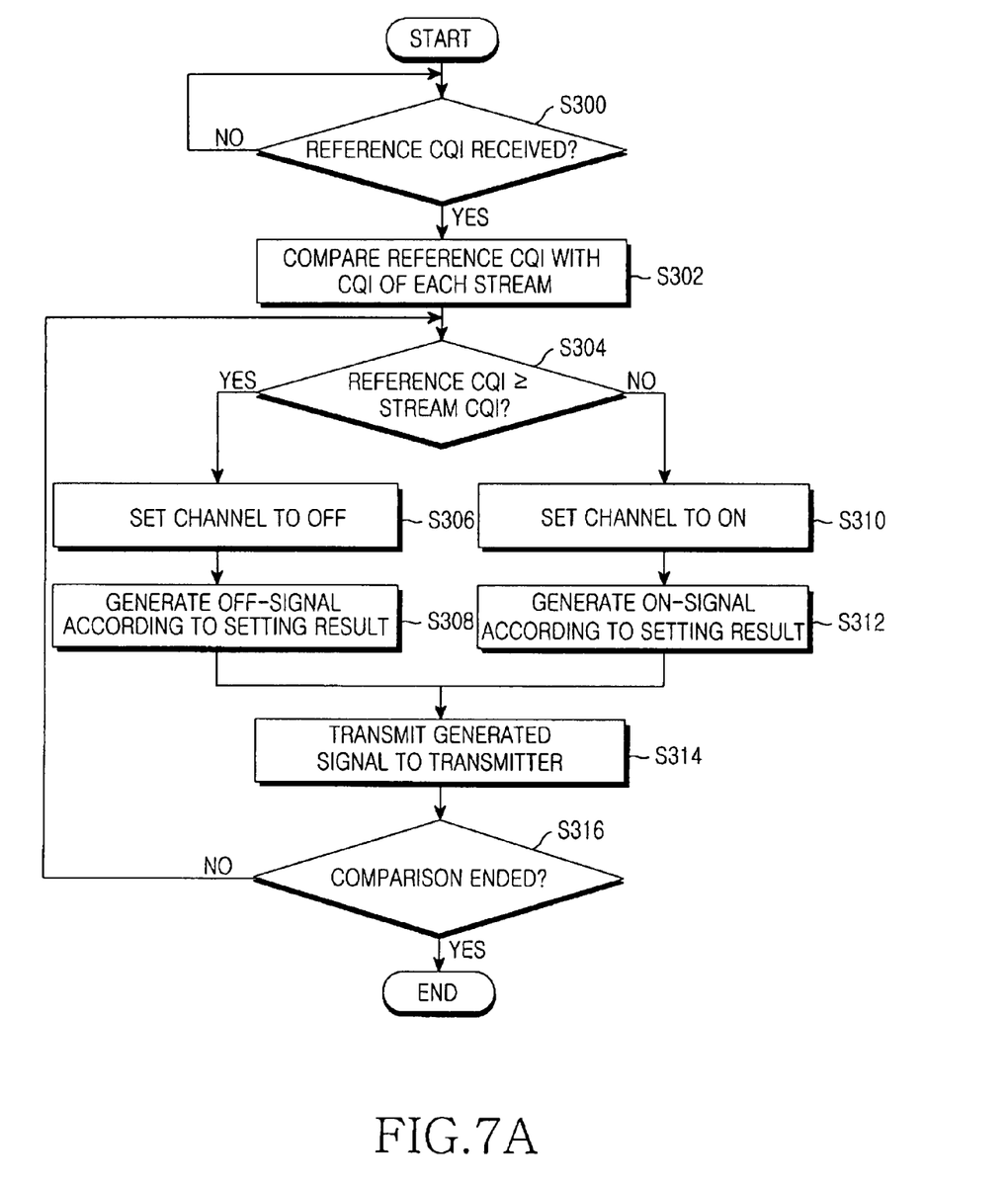
FIGS. 7A and 7B are flowcharts illustrating a feedback information transmission apparatus of a receiver in a multi-user MIMO system according to an exemplary embodiment of the present invention.

Upon receipt of a reference CQI from the transmitter, the receiver compares the received reference CQI with a CQI for each stream received from the transmitter in steps S300 and S302. The stream can be received via one antenna of the receiver, or can be received via multiple antennas included in the receiver. The reference CQI is commonly applied to every stream.

If the received reference CQI is greater than or equal to the CQI of the stream received from the transmitter, the receiver sets the channel, over which the stream was received, to Inactivation in steps S304 and S306. The process of setting the channel to the Inactivation includes indicating that the receiver will no longer receive the stream from the transmitter over the corresponding channel. To avoid additional reception of the stream, the receiver generates an Inactivation signal (that is, OFF signal) depending on the setting result given in step S306.

However, if the received reference CQI value is less than the CQI of the stream received from the transmitter in step S304, the receiver sets the channel, over which the stream was received, to Activation in steps S304 and S310. After setting the channel to Activation in step S310, the receiver generates an Activation signal (that is, ON signal) according to the setting result in step S312.

In step S314, the receiver transmits to the transmitter the Activation or Inactivation signal generated in steps S308 and S312. After step S314, the receiver checks in step S316 whether the processes of steps S04 to S314 have been completely performed on all streams. That is, for every received stream, the receiver compares the reference CQI with the CQI of each stream. If the comparison between the reference CQI and the CQI of every stream have not been completed yet in step S316, the receiver returns to step S304.

D. Activation/Inactivation Signals of all Streams are Transmitted at a Time

Figure 7B:
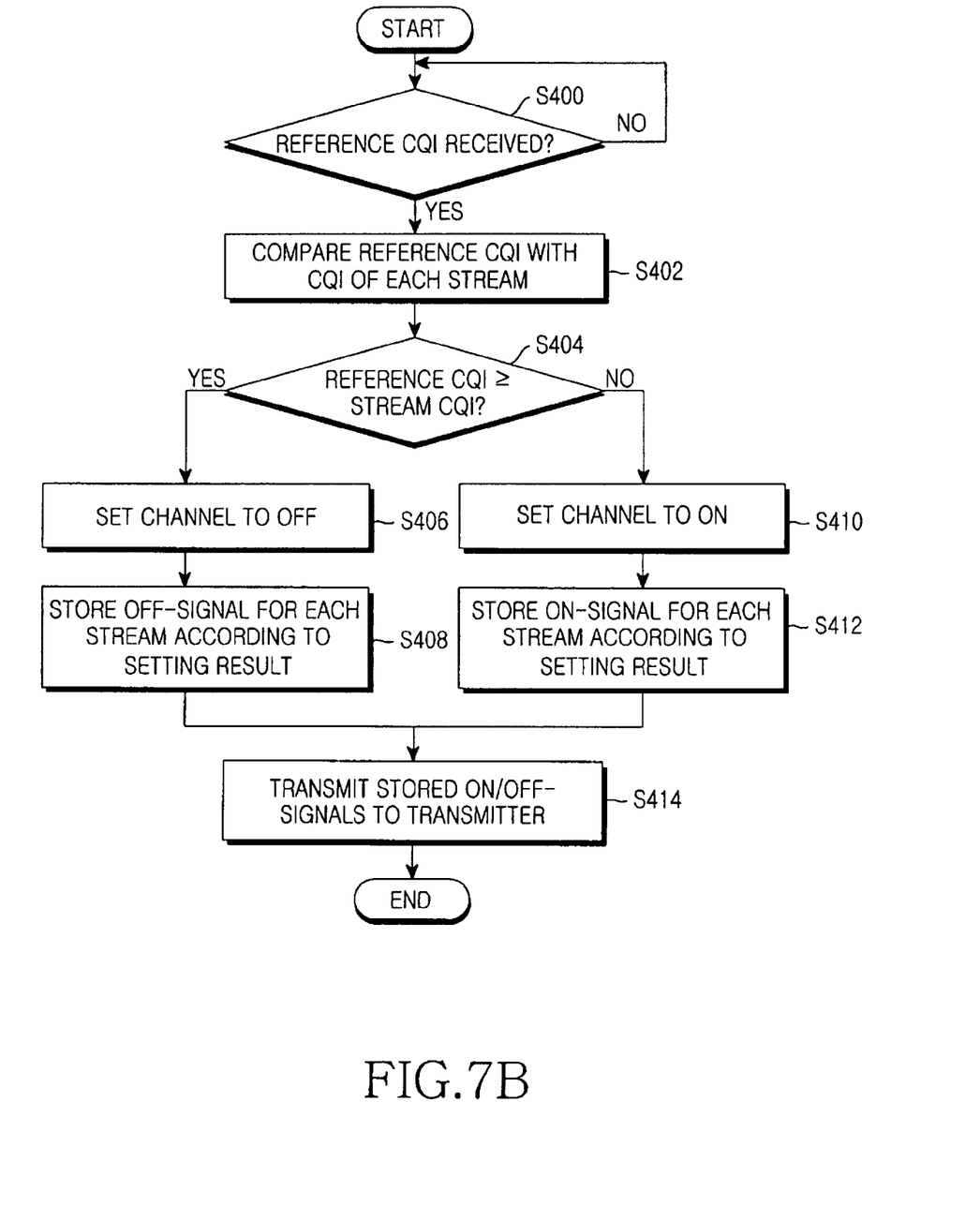

With reference to FIG. 7B, a detailed description will now be made of a feedback information transmission/reception method of a receiver in a multi-user MIMO system according to an exemplary embodiment of the present invention.

Referring to FIG. 7B, the proposed method of transmitting Activation/Inactivation signals of all streams at a time in the receiver is equivalent to the method of FIG. 7A in terms of the processes of steps S300 to S306 and S310.

In FIG. 7B, after comparing the received reference CQI with a CQI of a corresponding stream, if the received reference CQI in step S400 is greater than or equal to the CQI of the stream, the receiver sets the channel, over which the stream was received, to Inactivation in steps S402 to S406. After setting the stream-received channel to Inactivation in step S406, the receiver stores, in step S408, in a memory the Inactivation signal which is generated independently for each stream according to the setting result. However, if the received reference CQI is less than the CQI of the stream, the receiver sets the channel, over which the stream was received, to Activation in step S410. After setting the stream-received channel to Activation in step S410, the receiver stores in step S412 in the memory the Activation signal which is generated independently for each stream according to the setting result.

After performing the processes of steps S404 to S412 on all streams, the receiver transmits in step S414 to the transmitter the Activation/Inactivation signals stored in the memory.

As is apparent from the foregoing description, according to exemplary embodiments of the present invention, the receiver, even though it receives multiple streams from the transmitter, transmits to the transmitter the Activation and/or Inactivation information of the channel separately for each individual stream, thereby contributing to a reduction in the total amount of feedback information. The reduction in the amount of feedback information can contribute to an increase in the system performance and an increase in the throughput of transceivers.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A transmitter configured to receive feedback information in a Multiple Input Multiple Output (MIMO) system, comprising:
a channel state detector configured to:
receive channel setting information from a receiver after transmitting a reference Channel Quality Information (CQI) to the receiver, the reference CQI indicating a threshold configured to set a channel of the receiver to one of an Activation state and an Inactivation state; and
detect a channel state of the receiver depending on information provided by the received channel setting information; and
a controller configured to control beamforming of a plurality of antennas using the detected channel state,
wherein the channel setting information indicates the one of the Activation state and the Inactivation state of the channel and is generated by using the reference CQI and the channel state.

2. The transmitter of claim 1, wherein the reference CQI is determined differently for a first case where the transmitter has knowledge of statistical distribution of CQIs received from multiple receivers and for a second case where the transmitter has no knowledge of the statistical distribution of the CQIs.

3. The transmitter of claim 2, wherein in the first case, the reference CQI is determined when a probability that the reference CQI will be less than a CQI corresponding to the statistical distribution is substantially equal to a preset channel Activation ratio.

4. The transmitter of claim 2, wherein in the second case, the reference CQI at a specific time (t+1) is determined by subtracting a channel activation ratio targeted by transmitter from an actual Activation ratio received from more than one receiver at a specific time t, multiplying a result of the subtracting by a value used for determining a possible change in the reference CQI according to time, and adding the reference CQI used at the specific time t to a result of the multiplying.

5. A feedback information reception method of a transmitter in a Multiple Input Multiple Output (MIMO) system, the method comprising:
determining a reference Channel Quality Information (CQI) to be applied to a plurality of channels of a receiver, the determined reference CQI indicating a threshold configured to set the channels of the receiver to one of an Activation state and an Inactivation state;
transmitting the determined reference CQI to the receiver;
receiving channel setting information of the channels of the receiver;
detecting a channel state for each antenna of the receiver upon the receiving of the channel setting information; and
forming an antenna beam of the transmitter using the detected channel state for each antenna,
wherein the channel setting information indicates the one of the Activation state and the Inactivation state of the channel and is generated by using the determined reference CQI and the channel state.

6. The feedback information reception method of claim 5, wherein the reference CQI is determined differently for a first case where the transmitter has knowledge of statistical distribution of CQIs received from multiple receivers and for a second case where the transmitter has no knowledge of the statistical distribution of the CQIs.

7. The feedback information reception method of claim 6, wherein in the first case, the reference CQI is determined when a probability that the reference CQI will be less than a CQI corresponding to the statistical distribution is substantially equal to a preset channel Activation ratio.

8. The feedback information reception method of claim 6, wherein in the second case, the reference CQI at a specific time (t+1) is determined by subtracting a channel activation ratio targeted by the transmitter from an actual Activation ratio received from more than one receiver at a specific time t, multiplying a result of the subtracting by a value used for determining a possible change in the reference CQI according to time, and adding the reference CQI used at the specific time t to a result of the multiplying.

9. The feedback information reception method of claim 6, wherein in the first case, the reference CQI is calculated using $Prob(CQI \geq CQI_{reference}) = \alpha$, where $CQI_{reference}$ denotes the reference CQI, and $\alpha$ denotes a previously stored probability that the transmitter will determine a given CQI as Activation.

10. The feedback information reception method of claim 6, wherein in the second case, the reference CQI is calculated using $CQI_{reference}^{(t+1)} = CQI_{reference}^{(t)} + w(\alpha_{target} - \alpha_{target})$, where $CQI_{reference}^{(t+1)}$ denotes a reference CQI to be used at a time t+1, $\alpha_{target}$ denotes an Activation ratio targeted by the system, $\alpha^{(t)}$ denotes an Activation ratio that more than one receiver has reported at the time t, and w denotes a constant used for determining a possible change in the reference CQI according to time.

11. A receiver configured to transmit feedback information in a Multiple Input Multiple Output (MIMO) system, comprising:
a channel quality measurer configured to measure a Channel Quality Information (CQI) of a stream received from a transmitter;
a controller configured to:
compare the measured CQI of the stream with a reference CQI received from the transmitter;
set a corresponding channel to one of an Activation state and an Inactivation state according to a result of a comparison of the CQI of the stream with the reference CQI, the reference CQI indicating a threshold configured to set the corresponding channel to the one of the Activation state and the Inactivation state; and
generate channel setting information indicating the one of the Activation state and the Inactivation state of the corresponding channel; and
a transmission unit configured to transmit the channel setting information to the transmitter.

12. The receiver of claim 11, wherein the controller sets a channel of the stream to an Activation state, if the CQI of the stream is greater than or equal to the reference CQI.

13. The receiver of claim 11, wherein the controller sets a channel of the stream to an Inactivation state, if the CQI of the stream is less than the reference CQI.

14. The receiver of claim 11, wherein the channel state information is 1 bit in size.

15. The receiver of claim 11, wherein the reference CQI is:
determined when a probability that the reference CQI will be less than a CQI corresponding to statistical distribution is equal to a preset channel Activation ratio;
determined by:
subtracting a channel activation ratio targeted by the transmitter from an actual Activation ratio received from more than one receiver at a specific time t;

multiplying a result of the subtracting by a value used for determining a possible change in the reference CQI according to time; and adding the reference CQI used at the specific time t to a result of the multiplying; or any combination thereof.

16. A feedback information transmission method of a receiver in a Multiple Input Multiple Output (MIMO) system, comprising:

receiving a reference Channel Quality Information (CQI) from a transmitter;

comparing the received reference CQI with a CQI of a stream received from the transmitter;

setting a corresponding channel to one of an Activation state and an Inactivation state according to a result of the comparing of the received reference CQI with the CQI of the stream, the received reference CQI indicating a threshold configured to set the corresponding channel to the one of the Activation state and the Inactivation state;

generating channel setting information indicating the one of the Activation state and the Inactivation state of the corresponding channel; and transmitting the channel setting information to the transmitter.

17. The feedback information transmission method of claim 16, wherein the channel state information indicates that a channel over which the stream is received, is set to Inactivation, if the reference CQI is greater than or equal to the CQI of the stream.

18. The feedback information transmission method of claim 16, wherein the channel state information indicates that a channel, over which the stream is received, is set to Activation, if the reference CQI is less than the CQI of the stream.

19. The feedback information transmission method of claim 16, wherein the reference CQI is:

determined when a probability that the reference CQI will be less than a CQI corresponding to statistical distribution is equal to a preset channel Activation ratio;

determined by:

subtracting a channel activation ratio targeted by the transmitter from an actual Activation ratio received from more than one receiver at a specific time t;

multiplying a result of the subtracting by a value used for determining a possible change in the reference CQI according to time; and adding the reference CQI used at the specific time t to a result of the multiplying; or any combination thereof.

20. A Multiple Input Multiple Output (MIMO) system configured to transmit/receive Channel Quality Information (CQI), comprising:

a transmitter configured to:

transmit multiple streams and a reference CQI to a receiver; and form an antenna beam depending on channel state information received from the receiver; and the receiver configured to:

compare the reference CQI with a CQI of one or more of the multiple streams;

set a corresponding channel to one of an Activation state and an Inactivation state according to a result of comparing the reference CQI with the CQI of the one or more of the multiple streams, the reference CQI indicating a threshold configured to set the corresponding channel to the one of the Activation state and the Inactivation state;

generate the channel setting information indicating the one of the Activation state and the Inactivation state of the corresponding channel; and transmit the channel state information to the transmitter.

21. The MIMO system of claim 20, wherein the transmitter is further configured to determine:

the reference CQI when a probability that the reference CQI will be less than a CQI corresponding to statistical distribution is equal to a preset channel Activation ratio;

the reference CQI by:

subtracting a channel activation ratio targeted by the transmitter from an actual Activation ratio received from more than one receiver at a specific time t;

multiplying a result of the subtracting by a value used for determining a possible change in the reference CQI according to time; and adding the reference CQI used at the specific time t to a result of the multiplying; or any combination thereof.

22. The MIMO system of claim 20, wherein the transmitter is further configured to:

form a group of:

receivers that have a poor CQI that are located in a cell boundary area or a shadow area;

receivers that have a good CQI; or any combination thereof; and transmit a common reference CQI to the formed group.

23. A Channel Quality Information (CQI) transmission/reception method in a Multiple Input Multiple Output (MIMO) system, the method comprising:

determining, by a transmitter, a reference CQI using a CQI received from a receiver;

transmitting, by the transmitter, the reference CQI to the receiver;

upon receiving the reference CQI, comparing, by the receiver, the reference CQI with a CQI of a stream received from the transmitter; and setting, by the receiver, a channel, over which the stream is received, to one of an Activation state and an Inactivation state according to a result of the comparing of the reference CQI with the CQI of the stream, the reference CQI indicating a threshold configured to set the channel to the one of the Activation state and the Inactivation state;

generating, by the receiver, channel setting information indicating the one of the Activation state and the Inactivation state of the channel; and transmitting the channel setting information to the transmitter.

24. The CQI transmission/reception method of claim 23, wherein the reference CQI is:

determined when a probability that the reference CQI will be less than a CQI corresponding to statistical distribution is equal to a preset channel Activation ratio;

determined by:

subtracting a channel activation ratio targeted by the transmitter from an actual Activation ratio received from more than one receiver at a specific time t;

multiplying a result of the subtracting by a value used for determining a possible change in the reference CQI according to time; and adding the reference CQI used at the specific time t to a result of the multiplying; or any combination thereof.

* * * * *